United States Patent
Chamberlain et al.

(10) Patent No.: US 8,218,519 B1
(45) Date of Patent: Jul. 10, 2012

(54) TRANSMIT ID WITHIN AN AD HOC WIRELESS COMMUNICATIONS NETWORK

(75) Inventors: Scott L. Chamberlain, Cedar Rapids, IA (US); William B. Curry, Cedar Rapids, IA (US); Terry J. Hammer, Cedar Rapids, IA (US); Brian J. Keller, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1006 days.

(21) Appl. No.: 12/009,931

(22) Filed: Jan. 23, 2008

(51) Int. Cl.
*H04J 1/00* (2006.01)
*H04M 1/00* (2006.01)

(52) U.S. Cl. ......................... 370/343; 455/574
(58) Field of Classification Search .................. None
See application file for complete search history.

(56) References Cited

U.S. PATENT DOCUMENTS

| | | | | |
|---|---|---|---|---|
| 6,433,734 B1 * | 8/2002 | Krasner | ................... | 342/357.64 |
| 7,844,308 B2 * | 11/2010 | Rhee et al. | ................... | 455/574 |
| 2003/0186683 A1 * | 10/2003 | Yamato | ........................ | 455/411 |
| 2004/0122973 A1 * | 6/2004 | Keck et al. | ................... | 709/238 |
| 2005/0037768 A1 * | 2/2005 | Hwang et al. | ................ | 455/450 |
| 2005/0221816 A1 * | 10/2005 | Hall | ............................. | 455/423 |
| 2006/0142913 A1 * | 6/2006 | Coffee et al. | .................. | 701/35 |
| 2006/0291551 A1 * | 12/2006 | Goth | ............................. | 375/232 |
| 2008/0008276 A1 * | 1/2008 | Yokoyama | .................... | 375/347 |
| 2008/0013599 A1 * | 1/2008 | Malladi | ........................ | 375/132 |
| 2008/0170511 A1 * | 7/2008 | Shorty et al. | ................. | 370/254 |
| 2009/0059842 A1 * | 3/2009 | Maltseff et al. | ............... | 370/328 |

\* cited by examiner

*Primary Examiner* — John Blanton
(74) *Attorney, Agent, or Firm* — Donna P. Suchy; Daniel M. Barbieri

(57) ABSTRACT

The present example provides a method of providing a Transmit ID within an ad hoc wireless communications network, and use of the transmit ID to provide methods to select a node's transmit pattern (Transmit Patterns), to inform a node receiver that a packet is incoming that is to be decoded (Receive Packet Acquisition), to tell a node receiver how to efficiently retrieve pulses from multiple packets simultaneously (Efficient Receive Processing), and how to disburse network transmissions throughout network time (Network Traffic Smoothing). The present example may also provide for Network Management of the Transmit IDs for use in network bandwidth reduction and maintenance of the Transmit IDs within the Network.

19 Claims, 13 Drawing Sheets

Frame Structure
600

TRANSMIT ID WITHIN AN AD HOC WIRELESS COMMUNICATIONS NETWORK

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. FA878-05-C-0141 awarded by the U.S. Army Communications-Electronics Acquisition Center.

TECHNICAL FIELD

This description relates generally to communications systems and more specifically to the management of a network centric radio system, or 'radio network'.

BACKGROUND

Radio networks may often be established on an ad hoc basis, such as during emergency situations, or in battlefield use where communications typically must be quickly established between multiple users. Such networks are often referred to in the industry as Mobile Ad hoc NETworks, or MANETs. In addition to multiple users initially present in these situations, provision may also be made for additional radios, or nodes, joining or leaving the network without pre-planning or configuration, interference problems, incompatibility issues and the like.

Radio networks may transmit a variety of signals, including data such as telemetry and voice signals that may be encoded or digitally modulated. Such signals may be packetized for digital transmission. Packetized wireless data signals may be similar to those traveling over a wired data network, such as Ethernet over category 5 wire, or similar wired data networks. In such networks these packetized signals may collide or interfere with each other if simultaneous or near simultaneous transmissions are made, which can cause a loss of data, interference or the like.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a method of providing a Transmit ID within an exemplary MANET, and use of the transmit ID to provide methods to select a node's transmit pattern (Transmit Patterns), to inform a node receiver that a packet is incoming that is to be decoded (Receive Packet Acquisition), to tell a node receiver how to efficiently retrieve pulses from multiple packets simultaneously (Efficient Receive Processing), how to evenly distribute periodic network data transmissions over time (Network Traffic Smoothing), and how to route data packets over the network from a source node to the destination node or nodes (Network Routing).

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a networked communications system that may utilize Software Defined Radios (SDR)s. Although the present examples are described and illustrated herein as being implemented in an exemplary Joint Tactical Radio System ("JTRS"), the system described is provided as an example and not a limitation. As those skilled in the art will appreciate, the present examples are suitable for application in a variety of different types of SDR systems.

1. Introduction

In an SDR system, such as the exemplary JTRS, a hardware compatible data link can make use of a specialized waveform that may provide improved communications capability.

In radio communications with demand driven waveforms that can require low bandwidth and a small form factor hardware footprint, reduction of pulse collisions, reduced processing resources, and low network overhead can all be design goals in certain applications. Such a communications system may advantageously utilize a typically unique node identifier, or Transmit ID. A Transmit ID can reduce pulse collisions which can lead to reduced packet errors. Processing demand can be reduced by limiting the number of simultaneously received packets by a given network node and by allowing a node to understand the "transmit pattern" of packets received by the node's receiver. In addition, the Transmit ID can be used as a node's unique identifier to be used by network routing algorithms and protocols.

The Transmit ID may be used to select a node's transmit pattern (Transmit Patterns), to inform a node receiver that a packet is incoming and is to be decoded (Receive Packet Acquisition), to tell a node receiver how to efficiently retrieve pulses from multiple packets simultaneously (Efficient Receive Processing), how to disburse network transmissions throughout network time (Network Traffic Smoothing), and how to route data packets over the network from the source node to the destination node or nodes (Network Routing)

Figure 1:
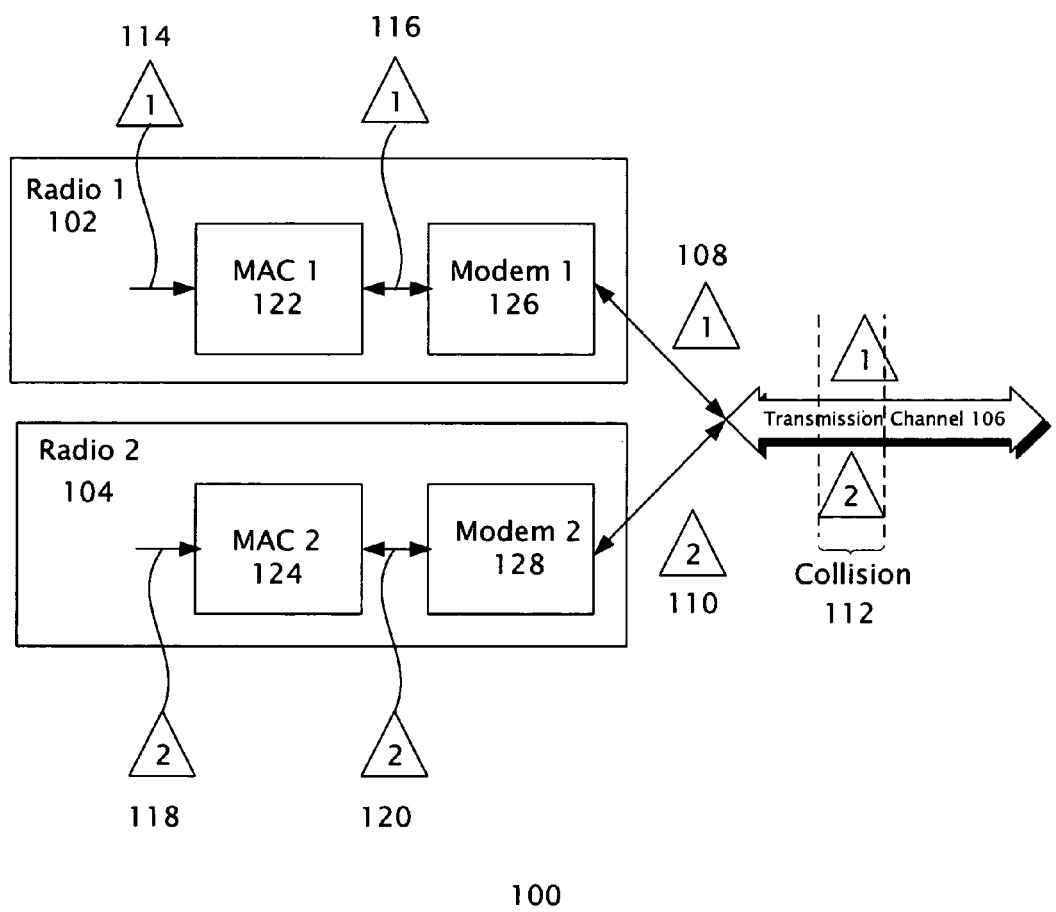
FIG. 1 is a block diagram showing a typical packet collision in a radio network.

FIG. 1 is a block diagram showing a typical packet collision in a radio network. In radio systems 100 utilizing demand driven media access controllers or MACs, 122, 124 packets received by the MACs 114, 118 are typically passed through the MAC 116, 120 sent directly to their respective modems 126, 128. Thus as the packets 108, 110 are transmitted from their respective radios 102, 104 negotiation with the network to coordinate transmission typically has not been performed. Thus as the packets enter the transmission channel 106 collisions 112 may occur.

For a MANET radio with a demand-driven MAC, when a transmit packet is received by the MAC, the packet is typically immediately sent to the modem for transmission without negotiation with the network. Since each node in the network is demand driven, there is some probability that multiple nodes will be transmitting at the same time; consequently, there is some probability that the packets transmitted by multiple nodes in the network will "collide" in the channel causing signal distortion, potentially to the point where the signal is indiscernible at the receiver. As packet collisions can translate into lost packets (packet errors), a demand-driven MAC typically requires special methods to mitigate signal distortion cause by packet collisions. These special methods include strong error correction coding, division of packets into pulses, pulse frequency hopping, and pulse transmit time jitter.

A small-form-factor waveform typically has limited processing resources which can significantly limit the number of simultaneous packets that can be processed by a given node's receiver. Demand-driven MAC waveforms typically use a robust staring receiver with a processing path specific to each frequency channel or group of frequency channels. These staring receivers typically have a large processing resource requirement in order to process multiple staring receives to cover all frequency channels.

For a demand-driven waveform with low-bandwidth and small-form-factor requirements, reductions of pulse collisions via frequency hopping and time jitter can still be important, but because of their limited processing capability, staring receivers are usually not an option. A Transmit Id can be used to facilitate the reduction of pulse collisions that can lead to packet errors and of reduced processing resource requirements by limiting the number of simultaneous packets that may be processed by a given node's receiver. The exemplary Transmit ID can be a dynamically assigned numeric value that can uniquely identify a node as it actively participates in the MANET.

2. Overview of Applications Utilizing Transmit ID

Transmit IDs may be assigned as described below. Once assigned, Transmit IDs may be managed or changed as a MANET is formed so that unique Transmit IDs may be maintained in the network formed. Transmit ID assignments can be periodically advertised throughout the network so that every node in the network typically knows the Transmit ID assignment of every other node. The Transmit IDs may be managed in a distributed fashion to ensure that duplicate assignments tend to be quickly mitigated, and every Transmit ID assignment is typically unique throughout the network.

The examples below also describe using Transmit IDs and the methods of using the Transmit IDs to reduce packet collisions and processing resources within a MANET.

The exemplary processes (or equivalent examples) that may be enabled by use of Transmit IDs include: Transmit Patterns, Receive Packet Acquisition, Efficient Receive Processing, Network Traffic Smoothing, and efficient Network Routing in a low bandwidth network.

Together, these examples tend to offer an efficient, integrated, and scalable approach for reducing pulse collisions and reducing processing resource requirements that tend to be inherent to networks with demand-driven Media Access Control (MAC) networks with frequency hopped waveforms and small-form-factor and limited bandwidth requirements. The elements are integrated such that they may all work together to reduce pulse collisions and processing resource requirements. The Transmit ID and the management of the Transmit IDs across the wireless network is the interface that integrates the independent elements and allows them to work together. These elements can be scalable because all that is needed to support addition nodes within the network is to add additional Transmit IDs, associated Transmit Patterns, and network support in the form of management data bits within the network overhead. A summary of each of the examples of using Transmit IDs, including management of Transmit ID assignments, is provided in the following sections.

3. Applications Utilizing Transmit ID

For the exemplary waveform, a Transmit ID is assigned to each node in the exemplary waveform's network. A network protocol can be used to manage the Transmit IDs within the network to ensure that multiple nodes do not have the same Transmit ID at a given time. The exemplary waveform can use the Transmit ID for several processes, namely:

Transmit Patterns—To select a node's transmit pattern

Receive Packet Acquisition—To inform a node's receiver that a packet is being sent to it that requires decoding Efficient Receive Processing—To inform a node's receiver how to efficiently retrieve pulses from multiple packets simultaneously Network Traffic Smoothing—To disburse network transmissions throughout network time The remainder of this section discusses these processes in more detail, including the role that Transmit IDs play in supporting these processes, how these processes can be used by the exemplary waveform to reduce packet collision and processing resources, and how the Transmit IDs are managed within the exemplary waveform's network.

3.1 Transmit Patterns

Figure 2:
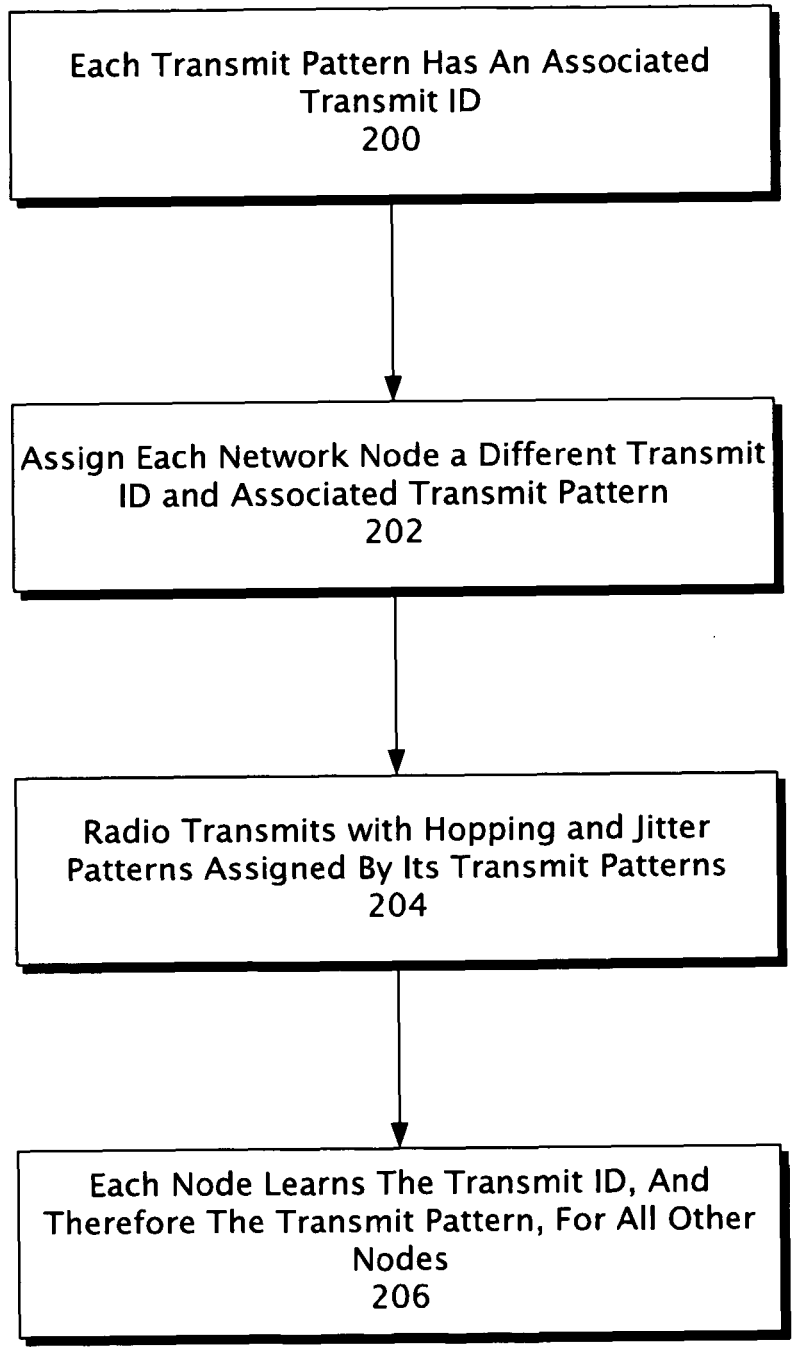
FIG. 2 is a block diagram showing a method of generating and transmitting transmit patterns, utilizing Transmit IDs throughout a radio system.

FIG. 2 is a block diagram showing a method of generating transmit patterns, utilizing Transmit IDs. The frequency hopping and time jitter patterns, in addition to the known symbol patterns, together are referred to as transmit patterns. Each Transmit Pattern has a Transmit ID associated with it 200.

Ideally, every packet transmitted over the network at a given time would have a different transmit pattern. The exemplary waveform can achieve this objective by assigning each network node a unique Transmit ID which, in turn, is used to reference an associated unique transmit pattern 202. When an exemplary waveform is transmitted, it can use the frequency hopping, time jitter patterns, and other characteristics that have been assigned to it via its Transmit ID 204. For the exemplary waveform, the transmit patterns typically must be assigned to each network node as each node comes "online" as newly activated or discovered nodes are added to the network. In addition, for the network to operate efficiently, each node must typically "learn" the Transmit ID for all the other nodes in the network 206. The exemplary waveform has a typical maximum network size of 160 nodes and, therefore, 161 transmit patterns are defined; one for each possible node and one broadcast transmit pattern. These transmit patterns are usually fixed and do not change; only the node assignment of the transmit pattern may change.

To make this transmit pattern assignment and learning process easier, the exemplary waveform may use Transmit IDs. Each transmit pattern is identified by a Transmit ID. When transmitting, a node uses its assigned Transmit ID to select the node's transmit pattern, i.e., frequency hop, time jitter, and the like for transmitting its packet pulses. As detailed in Section 3.1, Transmit IDs make the transmit pattern assignment and learning process easier because the amount of overhead data that needs to be sent over the network can be significantly reduced. In addition, because every node in the network knows the Transmit ID (transmit pattern) for every other node and because the data size of the a Transmit ID is small relative to the transmit patterns, synchronization pulses that contain a node's Transmit ID can be transmitted to "alert" a destination node that a transmission is being sent to it. As discussed in Section 3.3, this a priori information makes the receiver processing significantly more efficient.

In summary, the network is more efficient in terms of message routing overhead via compression afforded by use of Transmit IDs and receiver processing is more efficient because transmit patterns are know a priori via Transmit IDs transmitted within the synchronization pulses. These efficiencies together lead to reduced processing requirements.

3.2 Receive Packet Acquisition

Figure 3:
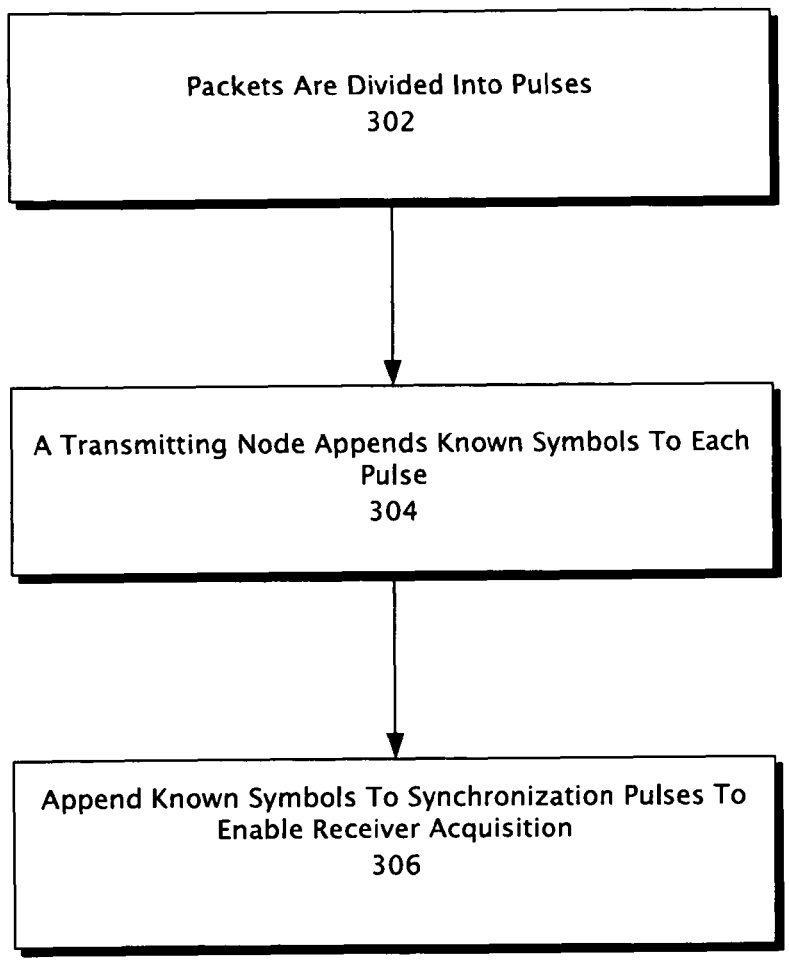
FIG. 3 is a block diagram showing a method of receive packet acquisition that includes informing a node's receiver that a packet is being sent that is to be decoded.

FIG. 3 is a block diagram showing a method of informing a node's receiver that an impending packet has been transmitted and is to be decoded. As mentioned in Section 1.0, packets are divided into pulses 302 in order to reduce packet collisions. In the method discussed, a transmitting node appends known symbols to each pulse 304 to allow acquisition of the pulses at a given receiver. The exemplary waveform appends known symbols to synchronization pulses to enable receiver acquisition 306. In order to reduce receiver processing, known symbols are used based on the Transmit ID of the target node or the broadcast Transmit ID in the case of a broadcast message. This process is possible because the Transmit ID of each network node is known by all other nodes in the network, as discussed in Section 3.5. When transmitting to a particular node, the transmitting node looks up the known symbols for the target node, using the node's Transmit ID, and appends the node's known symbol to the synchronization pulses. If transmitting a broadcast message, the transmitting node looks up the known symbols using the broadcast Transmit ID and appends the broadcast known symbol to the synchronization pulses. Using this approach, each node only needs to correlate to two patterns for packet acquisition; its own known symbol pattern and the broadcast known symbol pattern. Use of a Transmit ID enables this capability.

For the data pulses that follow the synchronization pulses, the transmitter appends its own known symbols, based on its own Transmit ID, to the data pulses. As discussed in Section 3.1, the Transmit ID of the transmitting node is included in the synchronization pulses; thus, when a receiver acquires and decodes a synchronization pulse, it knows the Transmit ID of the transmitting node. And, since it knows the transmitter's Transmit ID, it can look up the transmitter's known symbols, frequency hop, and time jitter patterns. Since all data pulse transmissions use the known symbols of the transmitter, a node's receiver only has to correlate to one know symbol pattern to acquire the data pulses for a given packet. Using this method, only data pulses that are intended for reception by a given node are processed through the receiver's data processing elements.

In summary, use of a Transmit ID makes receiver processing more efficient because of reduced acquisition and data processing requirements; in this case, efficiency also leads to reduced processing requirements.

3.3 Efficient Receive Processing

Figure 4:
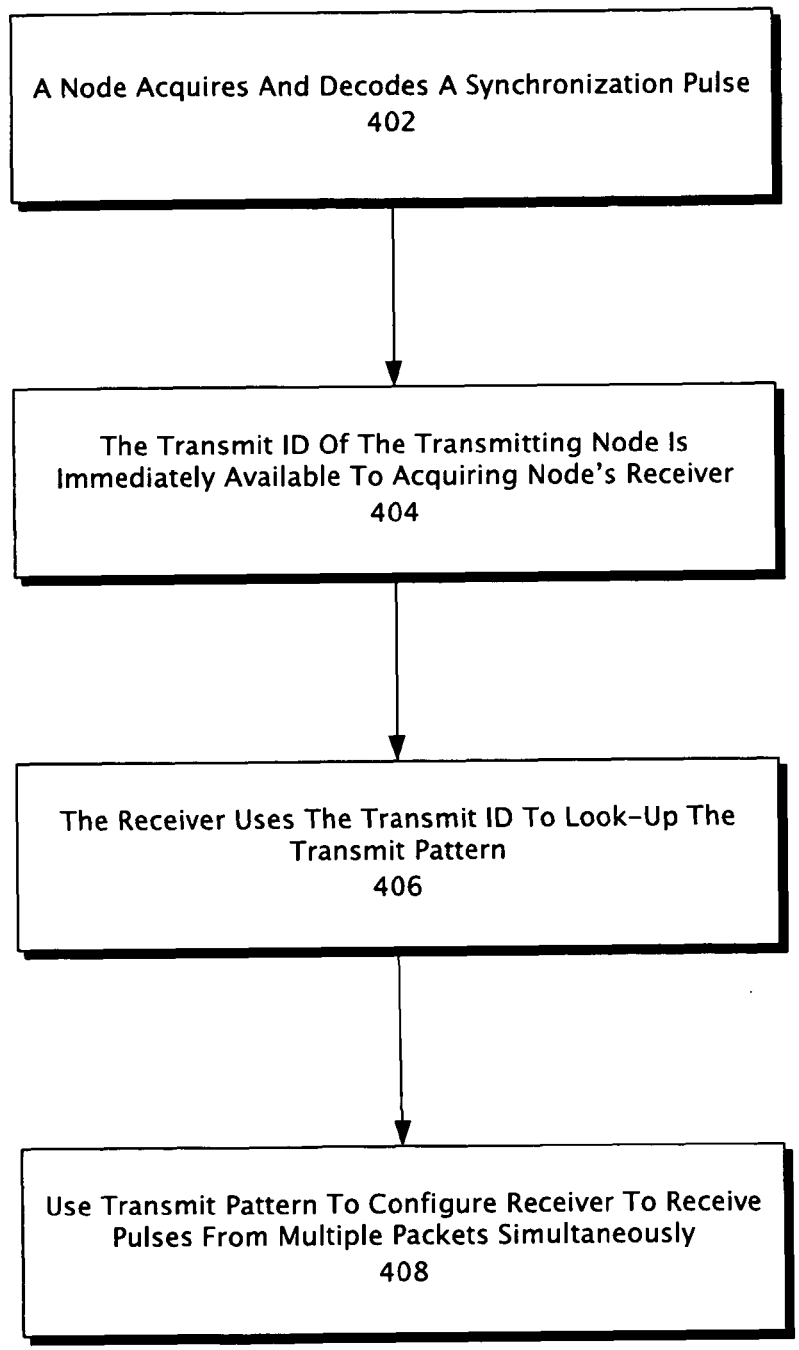
FIG. 4 is a block diagram showing a method of efficient receive processing in which a node's receiver is informed how to retrieve pulses from multiple packets simultaneously.

FIG. 4 is a block diagram showing a process to inform a node's receiver how to retrieve pulses from multiple packets simultaneously. As discussed, when a receiving node acquires and decodes a synchronization pulse (402), the Transmit ID of the transmitting node is immediately available to the acquiring node's receiver (404). The receiver uses this Transmit ID to look-up the transmit pattern (406) that will be used for processing the data pulses that are transmitted following the synchronization pulses, as discussed in Section 3.1. Knowing the transmit pattern for the data pulses for each received packet makes the process of capturing, transferring, filtering, and packetizing the data pulses significantly more efficient. A priori knowledge of the time jitter pattern for a packet's data pulses makes the extraction and transferring of the data pulses from pulse memory more efficient because the approximate position of the data pulses within pulse memory is known. A priori knowledge of the frequency hopping pattern allows on-the-fly tuning of the receiver's direct down converter and match filter functions (i.e. a smart tuning receiver rather than a staring receiver). Due to this capability and because the receiver knows the transmit ID of the node transmitting each packet, the receiver can extract pulses form multiple packets simultaneously and tune the receiver to process the pulses from different packets on-the-fly. Together, a priori knowledge of the transmit patterns reduces the number of dedicated processing paths required to process receive packets because the processing paths can be configured and used dynamically to process the pulses from multiple packets simultaneously.

In summary, the approach of using the Transmit ID, acquired from the synchronization pulses, to look-up the transmit pattern for incoming data pulses significantly reduces receive processing resources requirements because data pulses can be extracted efficiently from pulse memory, and processing elements can be configured and used dynamically to process receive pulses from multiple packets simultaneously 408.

3.4 Network Traffic Smoothing

Figure 5:
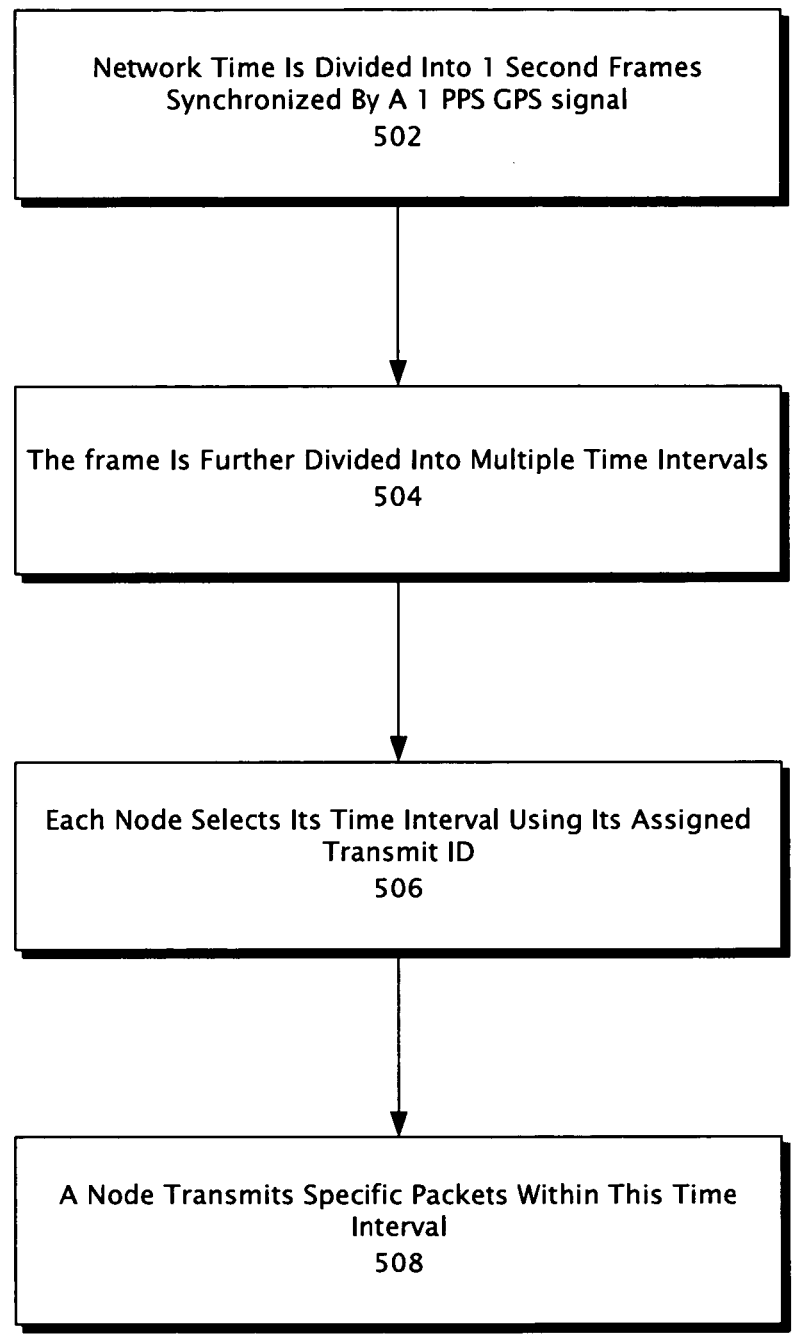
FIG. 5 is a block diagram showing a method of network traffic smoothing to disburse network transmissions throughout network time.

FIG. 5 is a block diagram showing a method to disburse network transmissions throughout network time. The time jitter pattern that is part of the transmit patterns, discussed in Section 3.1, is a micro time variance that is applied to each packet sent over the network to randomize the a node's transmit pulse position in time, relative to other packets from nearby nodes as they are transmitted over the channel. Unlike the time jitter, the Network Traffic Smoothing algorithm is a macro time adjustment that is used to evenly disburse periodically transmitted packets over time, in an attempt to limit the number of packets transmitted over the network at a given time. The purpose of the traffic smoothing algorithm is two fold: first to reduce packet collisions that can cause packet errors, and second to reduce processing resource requirements by limiting the number of simultaneous packets that typically must be processed by a given node's receiver.

The exemplary waveform can use Transmit IDs to efficiently perform the Network Traffic Smoothing. Specifically, time is divided into exemplary 1 second frames synchronized by a 1 Pulse Per Second (PPS) Global Positioning System (GPS) signal 502. In alternative examples differing frame durations and differing pulse repetition rates may be utilized. In additional examples synchronization signals other than a GPS signals may be substituted. The frame can be further divided into multiple time intervals 504 to form a frame structure. Each node selects its time interval using its assigned Transmit ID 506. A node transmits specific packets within this time interval 508. Different Transmit IDs map to different transmit intervals to distribute network traffic over the 1 second frame.

A frame structure is defined having a one second transmit frame and fifty 20 ms transmit intervals. A transmit interval is defined as fixed 20 ms interval within a 1 second transmit frame; thus, there are 50 transmit intervals numbered 0 to 49. The 1 second frame is synchronized by a 1 PPS GPS signal (502). Through this synchronization, each network node is aware of the frame and transmit interval timing relative to other nodes in the network. A node determines its current transmit interval by reading a transmit interval counter (504) each time it transmits its periodic data (i.e. Time Speed and Position Information). The interval counter is also synchronized to the 1 PPS signal and the output of the counter is the current transmit interval, 0 thru 49.

Figure 6:
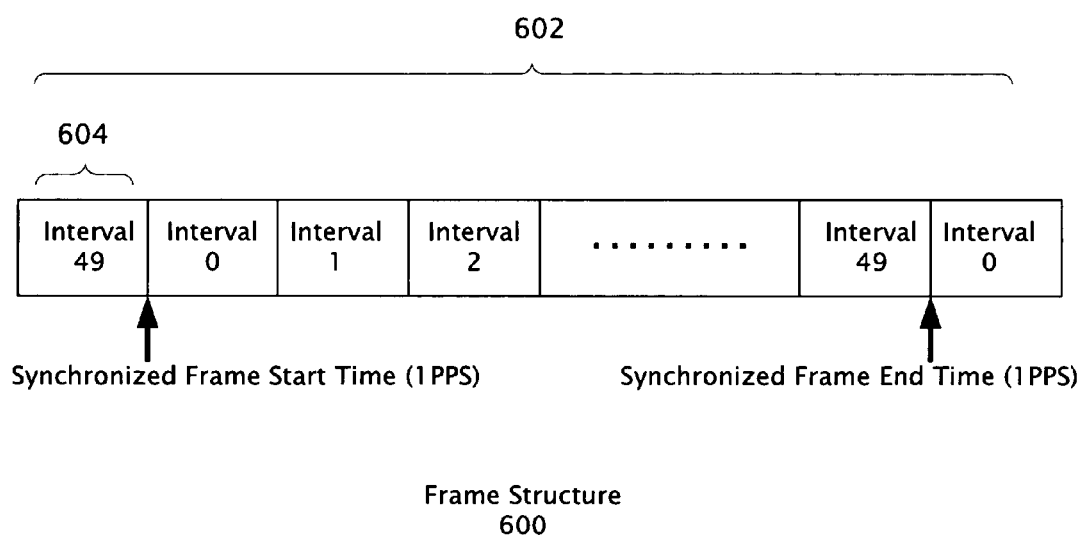
FIG. 6 shows a frame structure having a one second transmit frame having fifty 20 ms transmit intervals.

FIG. 6 shows a frame structure 600 having a one second transmit frame 602 having fifty 20 ms transmit intervals 604. The transmit intervals are numbered 0 to 49.

Returning to FIG. 5, a node will select its transmit interval based on the node's Transmit ID as given by the following equation:

$$\text{transmit\_interval} = (\text{transmit\_id} * X) \% Y + \text{TRUNCATE}((\text{transmit\_id} \% Y)/(Y/X)) \quad (1)$$

where, X is the desired interval distribution between sequential transmit IDs, Y is number of intervals in a frame, TRUNCATE is a function that truncates the operand to an integer value, and Y must typically be devisable by X.

Figure 7:
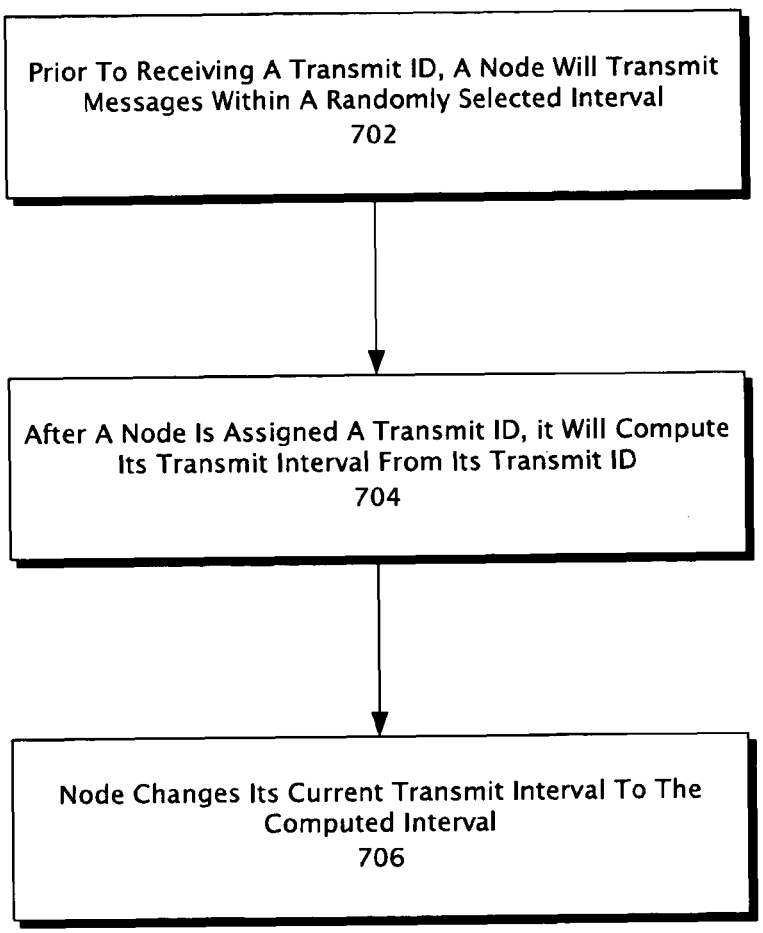
FIG. 7 is a flow diagram showing how a node may change its transmit interval.

FIG. 7 is a flow diagram showing how a node may change its transmit interval when it first comes "online", when the node is assigned an initial transmit ID, or when the node is assigned a new Transmit ID. As discussed in Section 3.5, Transmit IDs are negotiated in an ad hoc fashion as nodes are joining a network. Prior to receiving a Transmit ID, a node will transmit its periodic messages within a randomly selected interval 702. After a node is assigned a Transmit ID, it will compute its transmit interval from its Transmit ID 704 and change its current transmit interval to the computed interval 706. The relationship between the transmit interval and a Transmit ID is fixed. The Transmit IDs are assigned to network nodes randomly as they join the network; however, to further randomize use of the transmit intervals and avoiding clumping network transmissions within the transmit frame, the transmit interval for a given Transmit ID is distributed within a frame using the equation above. By distributing the periodic data in time using the Traffic Smoothing algorithm, fewer network transmissions will occur simultaneously. In turn, fewer simultaneously network transmissions reduces the number of packet collisions and reduces the number of packets a node must receive simultaneously.

In summary, the Network Traffic Smoothing algorithm is a macro time adjustment that is used to reduce packet collisions of periodic data that can cause packet errors and to reduce processing resource requirements by limiting the number of simultaneous transmissions received by a given network node. The Network Traffic Smoothing algorithm achieves these reductions by disbursing periodic transmissions by all network nodes in time based on there Transmit ID.

3.5 Network Management of Transmit IDs 3.5.1 Bandwidth Reduction

Many Mobile Ad Hoc Networks can have a known upper limit to the number of nodes operating in a network at one time. Each mobile node has a unique ID that identifies the node in the network. However, that unique id typically has more bits than are necessary to uniquely identify each node in the network. For example, the 32 bits in an IPv4 address could (potentially) uniquely identify up to 4,294,967,296 mobile nodes, where perhaps the network will support only as many as 160 nodes. Eight bits would be sufficient to uniquely identify all nodes in a 160 node network.

Currently, link state routing protocols can determine path information by relaying connectivity using the typically unique IDs to denote link information. By instead using Transmit IDs (which may have significantly fewer bits), it can be possible to reduce the bandwidth of several link state protocols. In this context, "unique ID" can be an identifier assigned (typically at the time of manufacture) to the node hardware that is guaranteed to be unique across all similar hardware. An Ethernet 48-bit MAC address, or its equivalent, is an example.

3.5.2 Resolution of Transmit IDs

The Distributed Dynamic Address Assignment (DDAA) protocol can operate with any link state routing protocol where unique ID and Transmit ID pairs are periodically distributed throughout the network. The Optimized Link State Routing (OLSR) algorithm, and variants thereof, work particularly well since only a subset of the nodes generate and relay this information, and that subset generates information about every node in the network.

Figure 8:
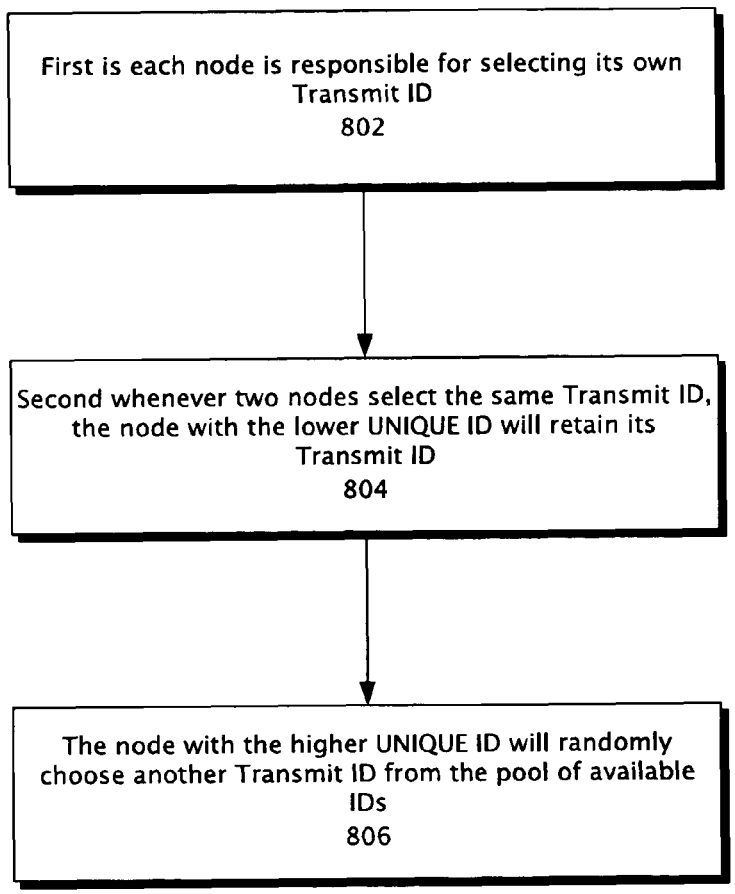
FIG. 8 shows a process for Distributed Dynamic Address Assignment.

FIG. 8 shows a process for Distributed Dynamic Address Assignment. There are a couple of basic principles that underlie DDAA. The address assignments are done dynamically and the assignments are distributed throughout the network such that there is no single/central node assigning the addresses. All nodes in the network may eventually know of the assignments as they are advertised (or distributed) throughout the network. First, each node is responsible for selecting its own Transmit ID 802. Second, whenever two nodes select the same Transmit ID, the node with the lower unique ID will retain its Transmit ID 804. The node with the higher unique ID will randomly choose another Transmit ID from the pool of available IDs 806. DDAA should ensure that:

[1] Conflicting Transmit ID assignments anywhere within the network are detected. (This functionality is accomplished by the underlying link state routing protocol through the periodic distribution of unique ID and Transmit ID pair information.)

[2] A stable resolution is obtained. This is accomplished though the DDAA protocol as described by step 2b in the protocol description below.

[3] Each node in the network learns of all the Transmit ID assignments. This is achieved by the use of DDAA Repair messages, as well as the underlying link state routing protocol.

The DDAA protocol typically requires 1 message type—a Repair message—in addition to what would be provided by the underlying link state routing protocol. The Repair message is designed to inform nodes that send a [unique ID, Transmit ID] pair, that there is a conflict in Transmit ID selection and a node with a lower unique ID has selected that Transmit ID. The Repair message contains: 1) the number of entries requiring correction 2) a list of correcting [unique ID, Transmit ID] pairs, 3) (optional) A bit vector indicating which Transmit IDs are know to be in use, that informs the changing node of all unused Transmit IDs.

Figure 9:
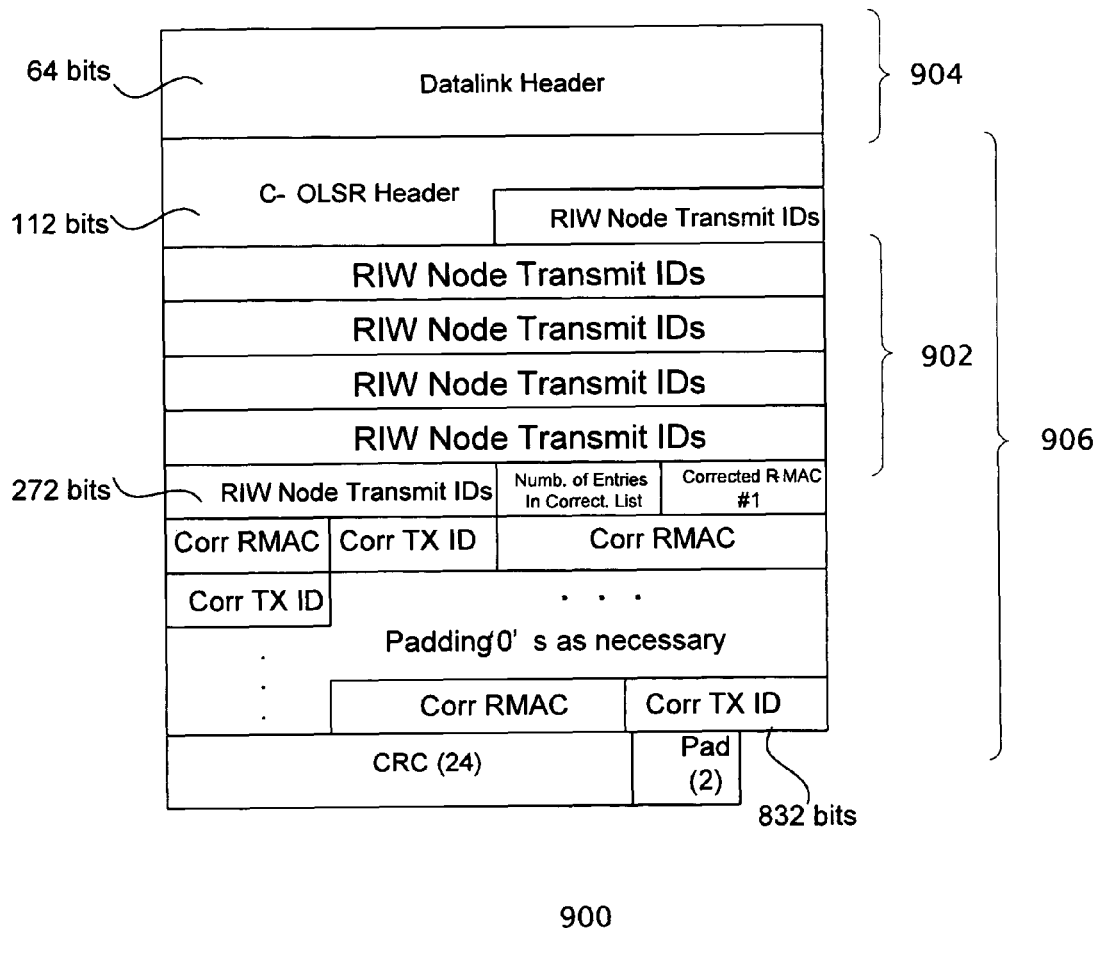
FIG. 9 shows an example of a Repair message.

FIG. 9 shows an example of a Repair message 900. Such a message typically includes a header 904, and a message containing the repair information 906. Each node typically must store a map between Transmit IDs 902 and unique IDs. Initially, each node has a record of the existence of other nodes. Each node potentially stores a list of pairings that would correct.

Figure 10:
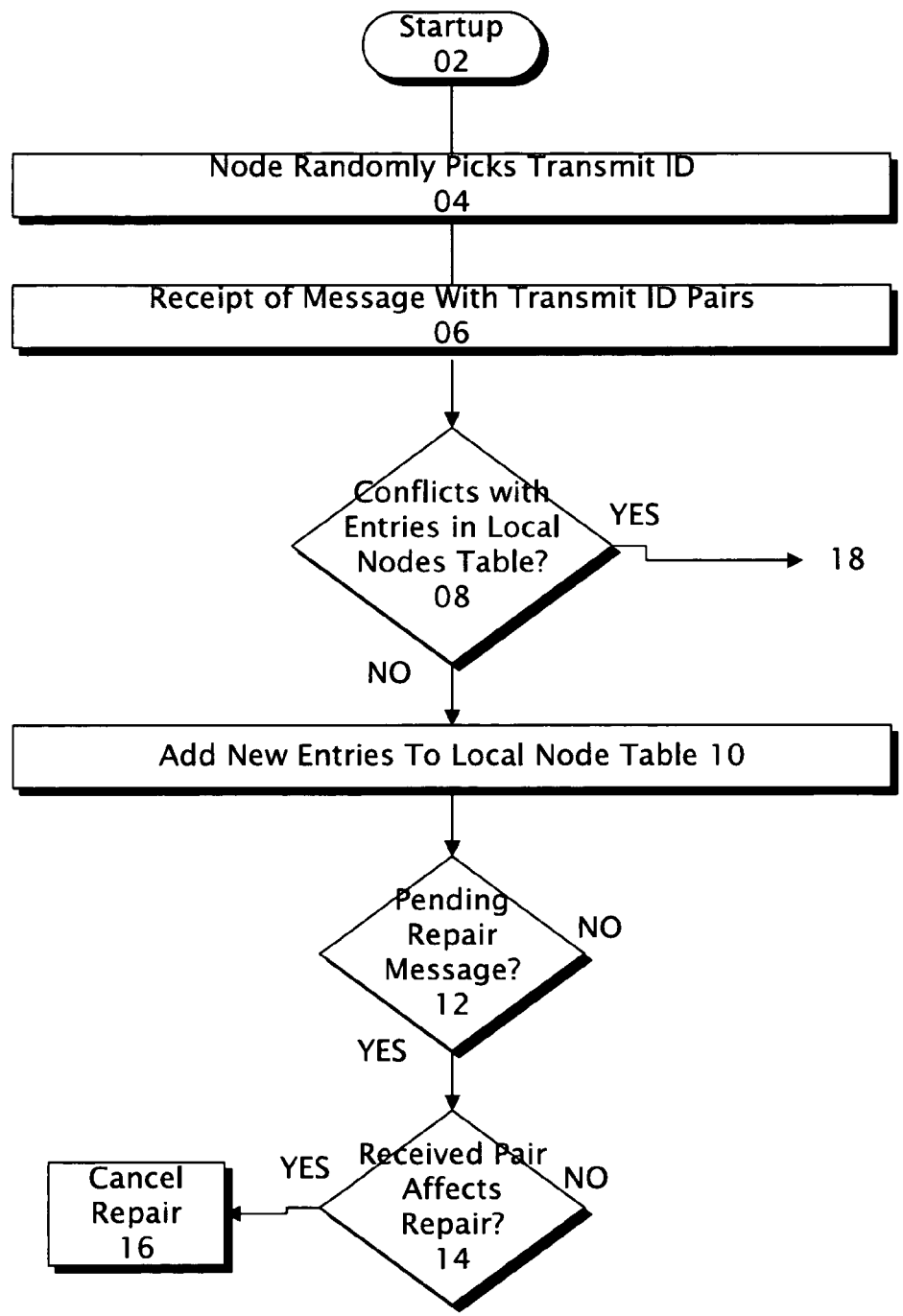
FIGS. 10-12 show a flow diagram of a method for resolving, or determining Transmit IDs.
Figure 11:
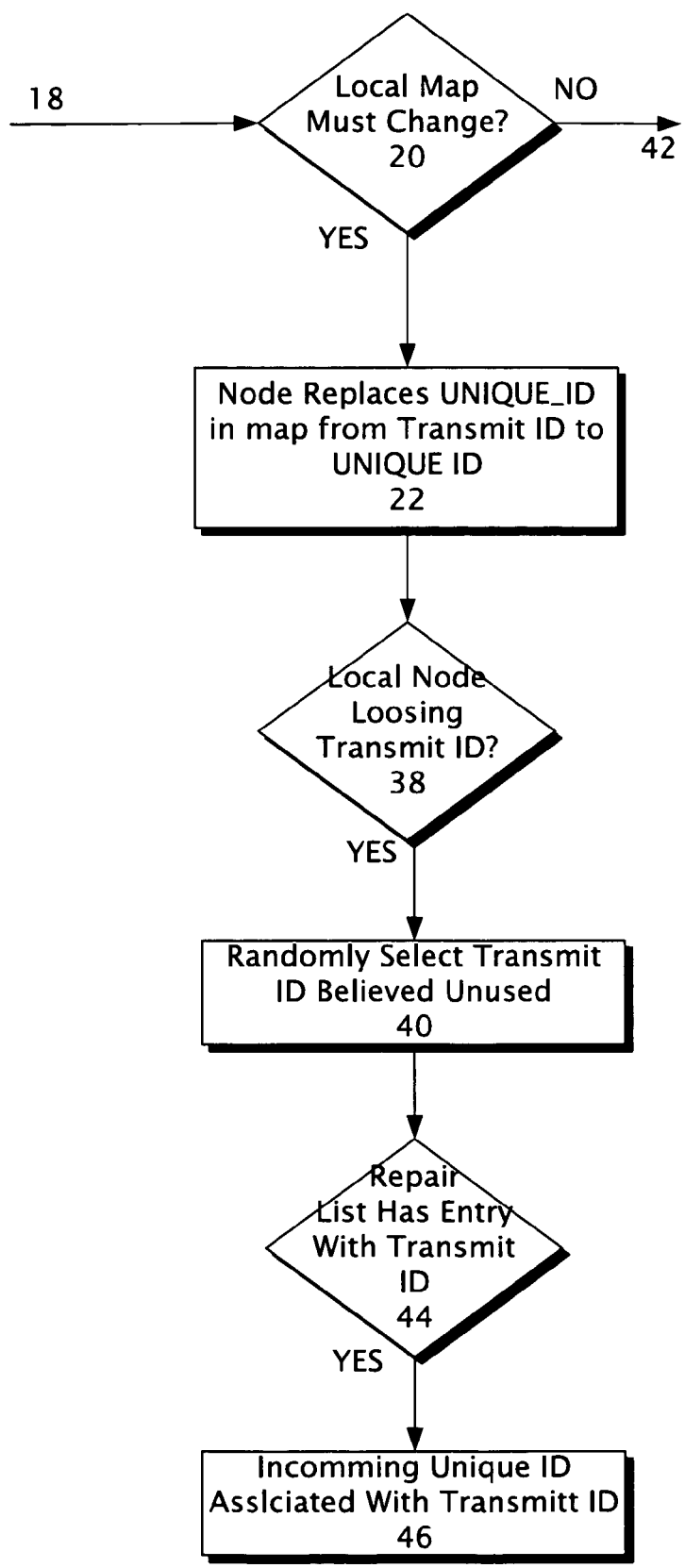
Figure 12:
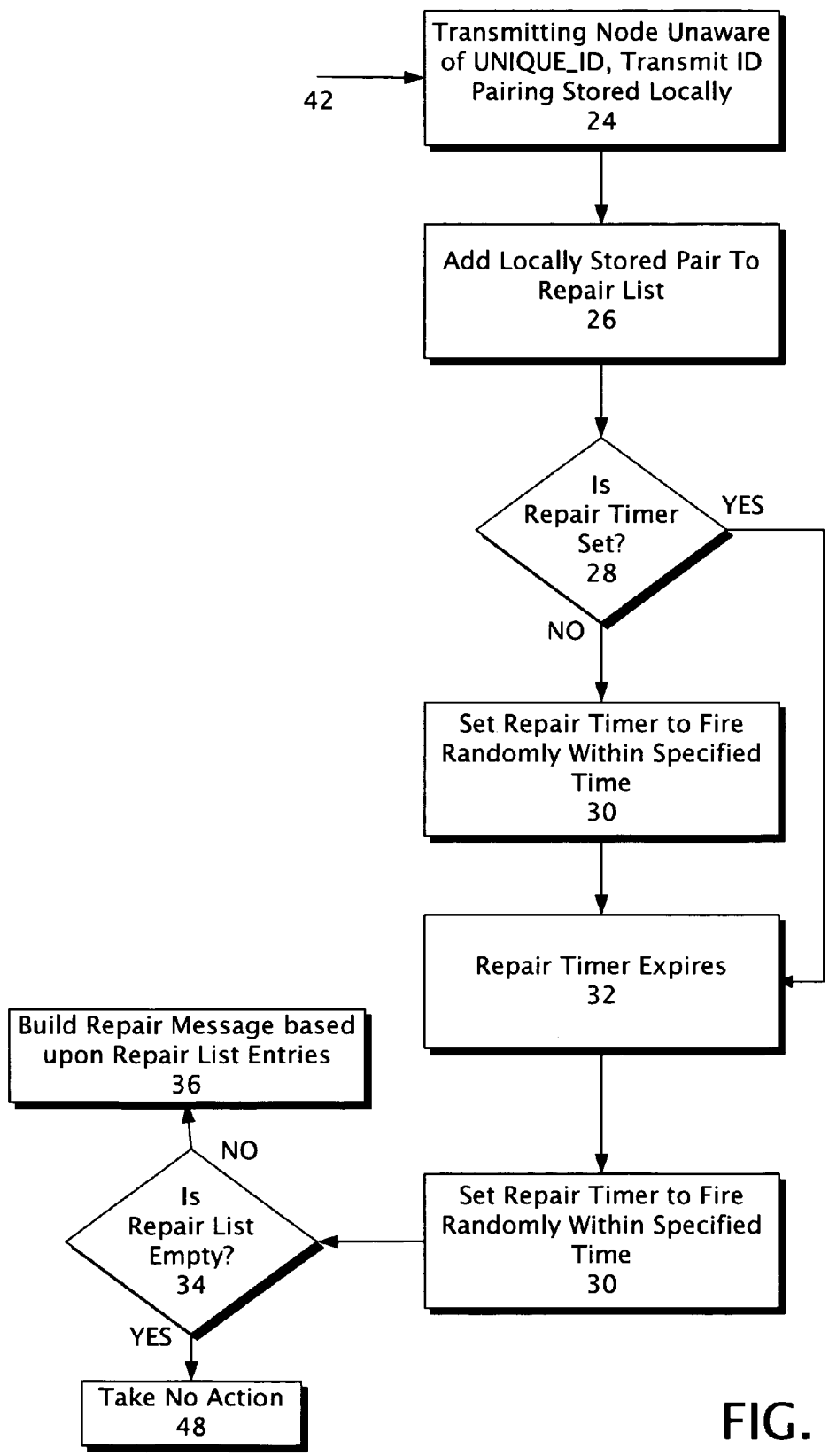

FIGS. 10-12 are a flow diagram of a method for resolving, or determining Transmit IDs. The method is:

1) Upon startup 1002, a node randomly picks a transmit ID (1004) in the range [0, MAX_NUMBER_IN_NET−1].

2) Upon receipt of a message (either Repair or normal routing message) with [unique ID, Transmit ID] pair(s) 1006. Next it is determined if the pair conflicts 1008.
  a) If the pair does not conflict (1018 inquiry response is yes) with entries in the local nodes table, add the previously unseen entries into the local node table. If there is a pending Repair message (1012 inquiry response is yes) and the received pair would affect the correction (1014, yes), cancel the pending repair (1016) and remove the repair entry from the repair list.
  b) If the pair does conflict with an entry in the table (1018, no),
    i) If the local Map changes (1020 inquiry response is yes), the node replaces the UNIQUE_ID in the Map from Transmit ID to unique ID 1022. If the local node was the node to lose its Transmit ID 1038, randomly select a Transmit ID that is believed to be unused 1040. If the Repair list has an entry with Transmit ID (1044 inquiry response is yes), the incoming unique ID typically must be associated with that Transmit ID 1046.
    ii) If the local Map does not need to change, (1020 inquiry response is no) then the transmitting node was unaware of a [unique ID, Transmit ID] pairing stored locally 1024. Add the locally stored pair to the Repair list 1026. If the Repair timer is not set (1028 inquiry response is no), set the Repair timer to fire randomly within [0, MAX_REPAIR_TIMER] seconds 1030. The value MAX_REPAIR_TIMER should not greatly exceed the average update rate for the link state protocol.

3) Upon the expiration of the Repair timer 1032
  a) If the Repair List is empty (1034 inquiry response is yes), take no action 1048
  b) Otherwise (1034 inquiry response is no), build a repair message based upon the entries in the Repair list 1036.

Figure 13:
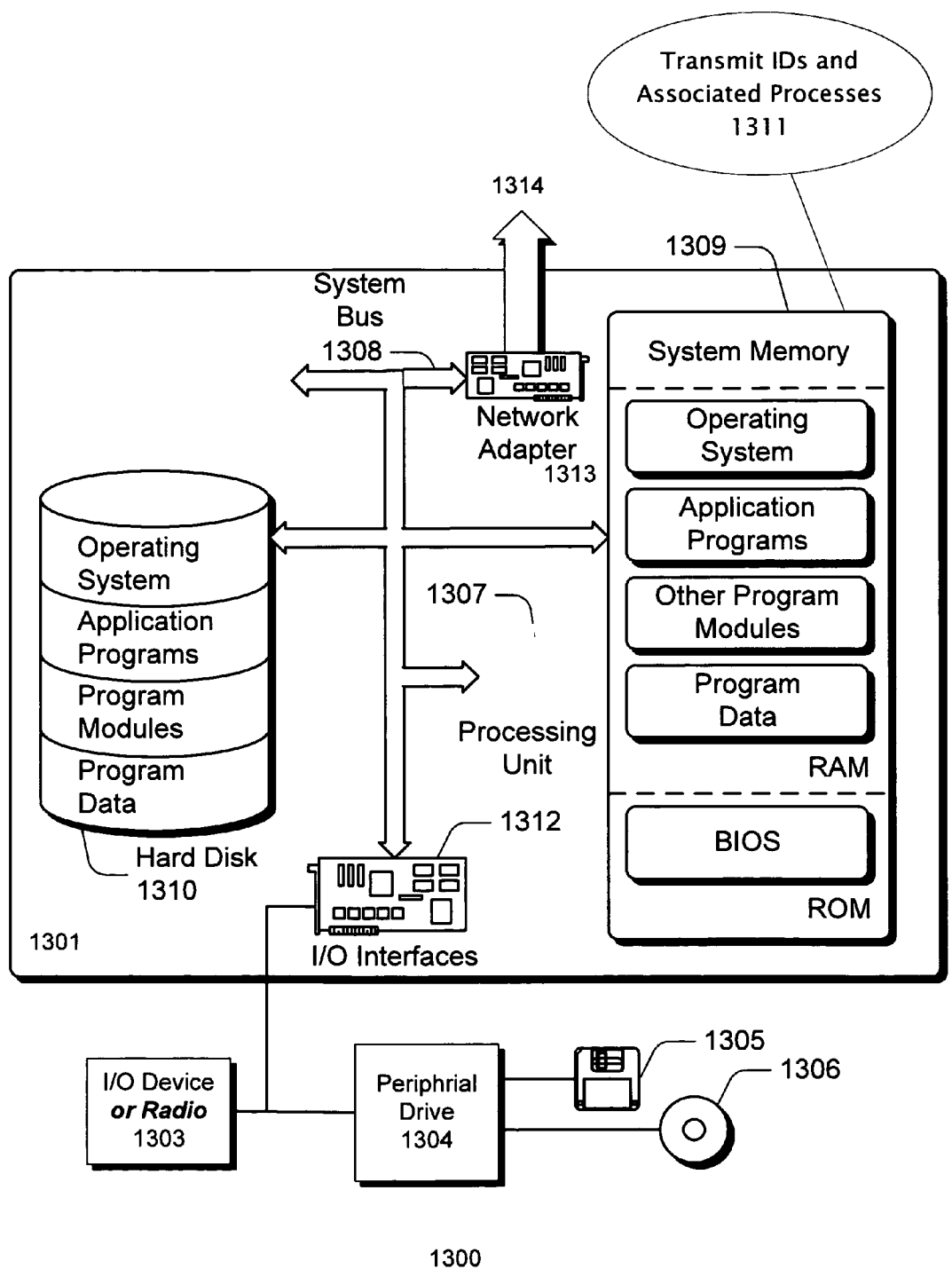
FIG. 13 illustrates an exemplary computing environment 1300 in which the Transmit ID described in this application, may be implemented.

FIG. 13 illustrates an exemplary computing environment 1300 in which the Transmit IDs and the processes advantageously utilizing the transmit IDs described in this application, may be implemented. Exemplary computing environment 1300 is only one example of a computing system and is not intended to limit the examples described in this application to this particular computing environment.

For example the computing environment 1300 can be implemented with numerous other general purpose or special purpose computing system configurations. Examples of well known computing systems, may include, but are not limited to, computer or processor controlled radio systems such as JTRS, personal computers, hand-held or laptop devices, microprocessor-based systems, multiprocessor systems, cellular telephones, PDAs, and the like which may be coupled to or otherwise integrated into a radio system.

The computer 1300 includes a general-purpose computing system in the form of a computing device 1301. The components of computing device 1301 can include one or more processors (including CPUs, GPUs, microprocessors and the like) 1307, a system memory 1309, and a system bus 1308 that couples the various system components. Processor 1307 processes various computer executable instructions, including those to create and utilize a Transmit ID as described above to control the operation of computing device 1301 and to communicate with other electronic and computing devices (such as a software defined radio, not shown). The system bus 1308 represents any number of several types of bus structures, including a memory bus or memory controller, a peripheral bus, an accelerated graphics port, and a processor or local bus using any of a variety of bus architectures.

The system memory 1309 in which processes 1311 such as transmit patterns, receive packet acquisition, efficient receive processing, network traffic smoothing, or the like (as well as the transmit ID) can be loaded, includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1307.

Mass storage devices 1304 may be coupled to the computing device 1301 or incorporated into the computing device by coupling to the buss. Such mass storage devices 1304 may include a magnetic disk drive which reads from and writes to a removable, non volatile magnetic disk (e.g., a "floppy disk") 1305, or an optical disk drive that reads from and/or writes to a removable, non-volatile optical disk such as a CD ROM or the like 1306. Computer readable media 1305, 1306 typically embody computer readable instructions, data structures, program modules and the like supplied on floppy disks, CDs, portable memory sticks and the like. The computer may also be coupled to an exemplary peripheral 1303 such as a radio terminal, node or other device capable of being operated under computer control. Alternatively the processor may be integrated as part of the radio assembly, and coupled to the radio internal to the assembly.

Any number of program modules or processes 1311 such as transmit patterns, receive packet acquisition, efficient receive processing, network traffic smoothing, or the like (as well as the transmit ID) can be stored on the hard disk 1310, Mass storage device 1304, ROM and/or RAM, including by way of example, an operating system, one or more application programs, other program modules, and program data. Each of such operating system, application programs, other program modules and program data (or some combination thereof) may include an embodiment of the systems and methods described herein that can utilize transmit IDs.

Computing device 1300 can operate in a networked environment using connections to one or more remote computers through one or more local area networks (LANs), wide area networks (WANs) and the like. The computing device 1301 is connected to a network 1314 via a network adapter 1313 or alternatively by a modem, DSL, ISDN interface or the like.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of selecting a transmit pattern of a node of an ad hoc network, the method comprising:
    assigning randomly a reassignable current transmit ID to the node, wherein said reassignable current transmit ID is randomly assigned from a list of all transmit IDs;
    selecting a transmit pattern for the node based upon an association of said reassignable current transmit ID to the transmit pattern;
    receiving synchronization pulses, wherein each of the synchronization pulses includes at least one current transmit ID associated with at least one of other nodes and wherein the at least one current transmit ID is a most recent transmit ID associated with the at least one of the other nodes;
    processing the synchronization pulses to determine characteristics of the at least one of the other nodes, wherein the characteristics include the at least one current transmit ID and at least one transmit pattern of the at least one of the other nodes;
    storing the characteristics;
    determining whether said reassignable current transmit ID of the node or the transmit pattern of the node conflicts with any of the at least one current transmit ID or the at least one transmit pattern of the at least one of the other nodes;
    resolving said reassignable current transmit ID and the transmit pattern of the node if said reassignable current transmit ID conflicts with any of the at least one current transmit ID of the at least one of the other nodes, wherein the step of resolving further includes:
        reassigning randomly a new reassignable current transmit ID to the node from the list of all transmit IDs; and
        selecting a new transmit pattern for the node to transmit within based upon the new reassignable current transmit ID, if the step of reassigning randomly the new reassignable current transmit ID is performed.

2. The method of claim 1, wherein the transmit pattern includes a hopping pattern.

3. The method of claim 1, wherein the transmit pattern includes a jitter pattern.

4. The method of claim 1, wherein the transmit pattern includes a symbol pattern.

5. The method of claim 1, wherein the method further includes:
    receiving an incoming targeted transmission, wherein the incoming targeted transmission is appended or prepended with said reassignable current transmit ID associated with the node; and
    processing the incoming targeted transmission.

6. The method of claim 1, wherein storing the characteristics includes updating the characteristics of the at least one of the other nodes.

7. The method of claim 1, wherein the transmit pattern is fixed.

8. The method of claim 1, wherein the method further includes transmitting an outgoing targeted transmission appended or prepended with one of the current transmit IDs associated with at least one of the other nodes.

9. A method of dispersing network transmissions throughout time in an ad hoc network, the method comprising:
    apportioning network time as a plurality of frames synchronized by a GPS signal, wherein each frame of the plurality of frames comprises a plurality of time intervals to form a frame structure;
    assigning randomly a reassignable current transmit ID to a node as the node connects to the ad hoc network, wherein said reassignable current transmit ID is randomly assigned from a list of all transmit IDs;
    selecting a time interval for the node to transmit within based upon said reassignable current transmit ID of the node;
    receiving synchronization pulses, wherein each of the synchronization pulses includes at least one current transmit ID associated with at least one of other nodes;
    processing the synchronization pulses to determine characteristics of the other nodes, wherein characteristics of the other nodes include current transmit IDs and associated time intervals of the other nodes;
    determining whether said reassignable current transmit ID or the time interval of the node conflicts with any of the current transmit IDs or the associated time intervals of the other nodes;
    resolving said reassignable current transmit ID or the time interval of the node if said reassignable current transmit ID or the time interval conflicts with any of the current transmit IDs or the associated time intervals of the other nodes, wherein the step of resolving further includes:
        reassigning randomly a new reassignable current transmit ID to the node from the list of all transmit IDs;
        changing the time interval for the node to transmit within based upon the new reassignable current transmit ID, if the step of reassigning randomly is performed; and
    transmitting by the node a plurality of pulses within the time interval.

10. The method of claim 9, wherein the frames have a duration of substantially one second.

11. The method of claim 9, wherein the GPS signal is a one pulse per second GPS signal.

12. The method of claim 9, wherein the frame structure includes a one second transmit frame subdivided into substantially 20 ms transmit intervals.

13. The method of claim 9, wherein the method includes determining the associated time intervals of the other nodes.

14. A method of providing efficient receive processing in a mobile ad hoc network, the method comprising:
    receiving a synchronization pulse at a node of the mobile ad hoc network, wherein the synchronization pulse includes a randomly assigned transmit ID for the node;
    determining the randomly assigned transmit ID for the node;
    processing a synchronization pulse at the node;
    determining a transmit ID of a transmitting node from the synchronization pulse;
    storing the transmit ID of the transmitting node;
    determining whether the randomly assigned transmit ID of the node conflicts with the transmit ID of the transmitting node;
    resolving the randomly assigned transmit ID of the node if the randomly assigned transmit ID of the node conflicts with the transmit ID of the transmitting node, wherein the step of resolving further includes:
        receiving a new randomly assigned transmit ID at the node from a list of all transmit IDs;

determining a transmit pattern of the transmitting node based upon the transmit ID of the transmitting node;

configuring a receiver to receive a plurality of pulses simultaneously through at least one of strong error correction coding, division of packets into pulses, pulse frequency hopping, or pulse transmit time jitter;

tuning the receiver dynamically to receive simultaneous incoming data pulses based upon the transmit patterns of the transmitting node and other transmitting nodes; and acquiring a data pulse at the node.

15. The method of claim 14, wherein the transmit ID of the transmitting node is processed from the synchronization pulse as the synchronization pulse is received.

16. The method of claim 14, wherein the transmit patterns determine a plurality of data pulses.

17. The method of claim 16, wherein the plurality of data pulses are transmitted after a plurality of synchronization pulses.

18. The method of claim 14, wherein the step of configuring the receiver to receive the plurality of pulses simultaneously includes:

selecting based upon stored transmit patterns of other nodes the use of at least one of strong error correction coding, division of packets into pulses, pulse frequency hopping, or pulse transmit time jitter.

19. The method of claim 14, further comprising reducing network overhead by reducing overhead data transmitted.

* * * * *